(12) United States Patent
Allo et al.

(10) Patent No.: US 12,540,893 B2
(45) Date of Patent: Feb. 3, 2026

(54) MASS CYTOMETRY REAGENTS AND METHODS FOR SIGNAL AMPLIFICATION

(71) Applicant: Standard BioTools Canada Inc., Markham (CA)

(72) Inventors: Bedilu Allo, Whitby (CA); Xudong Lou, Richmond Hill (CA); Peng Liu, Markham (CA); Daniel Majonis, North York (CA); Anastasia Mavropoulos, Daly City (CA); Ladan Gheiratmand, Toronto (CA)

(73) Assignee: STANDARD BIOTOOLS CANADA INC., Ontario (CA)

(*) Notice: Subject to any disclaimer, the term of this patent is extended or adjusted under 35 U.S.C. 154(b) by 867 days.

(21) Appl. No.: 17/786,163

(22) PCT Filed: Dec. 18, 2020

(86) PCT No.: PCT/US2020/066012
§ 371 (c)(1),
(2) Date: Jun. 16, 2022

(87) PCT Pub. No.: WO2021/127435
PCT Pub. Date: Jun. 24, 2021

(65) Prior Publication Data
US 2023/0236105 A1    Jul. 27, 2023

Related U.S. Application Data

(60) Provisional application No. 62/949,805, filed on Dec. 18, 2019.

(51) Int. Cl.
G01N 21/64    (2006.01)
C07F 5/02    (2006.01)
(Continued)

(52) U.S. Cl.
CPC ....... *G01N 15/1429* (2013.01); *G01N 33/483* (2013.01); *G01N 2015/1006* (2013.01); *G01N 2458/15* (2013.01)

(58) Field of Classification Search
CPC ............ G01N 15/1429; G01N 33/483; G01N 2015/1006; G01N 2458/15; G01N 33/58;
(Continued)

(56) References Cited

U.S. PATENT DOCUMENTS 5,907,035 A * 5/1999 Guinn ...................... C07K 1/22
530/380
2004/0086943 A1    5/2004 Andres et al.
(Continued)

FOREIGN PATENT DOCUMENTS

JP    2009014433 A    1/2009
JP    2014533242 A    12/2014
(Continued)

OTHER PUBLICATIONS

Ederth, J., et al. "Indium tin oxide films made from nanoparticles: models for the optical and electrical properties." Thin solid films 445.2 (2003): 199-206. (Year: 2003).*
(Continued)

*Primary Examiner* — Jennifer Wecker
*Assistant Examiner* — Oyeleye Alexander Alabi
(74) *Attorney, Agent, or Firm* — Kilpatrick Townsend & Stockton LLP

(57) ABSTRACT

Described herein are reagents and methods for improving signal in imaging mass cytometry. Aspects include mass tags with a large number of labeling atoms, chemical modifications to mass tags and additional reagents to reduce background and/or maintain target binding of mass tagged specific binding partners (SBPs), and schemes for associating a plurality of mass tags with a single SBP. As such, embodi-
(Continued)

ments include any combination of one or more reagents and their use. The reagents, kits and methods herein may be used for mass cytometry, including imaging mass cytometry. In some aspects, reagents, kits or methods may be used for delivery of a large number of radioisotopes to a target analyte, for example for therapeutic use or radiometric detection. In certain aspects, only non-radioactive isotopes may be used for mass cytometry.

21 Claims, 2 Drawing Sheets

(51) Int. Cl.
  *C09B 57/00* (2006.01)
  *C09K 11/06* (2006.01)
  *G01N 15/10* (2024.01)
  *G01N 15/1429* (2024.01)
  *G01N 33/483* (2006.01)
  *G01N 33/68* (2006.01)

(58) Field of Classification Search
  CPC ........... G01N 2560/00; G01N 33/6848; G01N 15/1031; H01J 49/0463; H01J 49/105; H01J 49/26
  See application file for complete search history.

(56) References Cited

U.S. PATENT DOCUMENTS

| | | | |
|---|---|---|---|
| 2004/0259164 A1 | 12/2004 | Gygi | |
| 2005/0191696 A1 | 9/2005 | Goldmakher et al. | |
| 2015/0183895 A1* | 7/2015 | Winnik | C08F 8/32 |
| | | | 525/360 |
| 2018/0164308 A1* | 6/2018 | Walter | G01N 33/58 |
| 2018/0188264 A1* | 7/2018 | Ornatsky | C12Q 1/68 |
| 2019/0004061 A1* | 1/2019 | Hong | G01N 33/6848 |
| 2019/0194532 A1* | 6/2019 | York | C08G 61/123 |
| 2019/0345272 A1 | 11/2019 | Winnik et al. | |

FOREIGN PATENT DOCUMENTS

| | | | | |
|---|---|---|---|---|
| JP | 2016537643 A | 12/2016 | | |
| JP | 2018508752 A | 3/2018 | | |
| KR | 20180081561 A | 7/2018 | | |
| WO | 2016090356 A1 | 6/2016 | | |
| WO | 2018194755 A1 | 10/2018 | | |
| WO | 2019/089088 A1 | 5/2019 | | |
| WO | WO-2019210233 A1 * | 10/2019 | ......... | G01N 33/6848 |
| WO | 2020/055743 A1 | 3/2020 | | |

OTHER PUBLICATIONS

European Search Report for EP 20903075 mailed Oct. 13, 2023, all pages.
Han et al., "Metal-isotope-tagged monoclonal antibodies for high-dimensional mass cytometry," Nature Protocols, Sep. 26, 2018 (Sep. 26, 2018), vol. 13, No. 10, pp. 2121-2148, entire document, 43 pages.
International Search Report and Written Opinion for PCT/US2020/066012 mailed Mar. 23, 2021, all pages.
Canadian Application No. CA3,162,257, Office Action, Mailed On Nov. 2, 2023, 4 pages.
Japanese Application No. JP2022-537268, Office Action, Mailed On Oct. 18, 2024, 12 pages.
Korean Application No. KR10-2022-7024128, Office Action, Mailed On Feb. 18, 2025, 8 pages.
European Application No. EP20903075.8, Office Action, Mailed On May 7, 2025, 5 pages.

\* cited by examiner

Edge Effect

MASS CYTOMETRY REAGENTS AND METHODS FOR SIGNAL AMPLIFICATION

BACKGROUND

Mass cytometry, including imaging mass cytometry (IMC), enables highly multiplexed detection of target analytes through detection of mass tags by mass spectrometry. Mass tags are typically associated with target analytes through a specific binding partner (SBP) such as an antibody. Mass tags may have one or more copies of a labeling atom (e.g., a single isotope, such as an enriched isotope) that is distinguished from the mass labeling atoms of other mass tags. A labeling atom may be a metal isotope not endogenous to the cell.

The majority of labeling atoms may be lost upstream of mass detection due to a variety of considerations such as space-charge effects and the separation of labeling atoms from endogenous atoms. As such, association of may mass tags with an SBP may be desired. However, polymer and/or nanoparticle mass tags present a number of unique challenges that impact background and binding of the SBP that are not considerations for other tags such as fluorescent based tags.

DESCRIPTION

Figure 1:
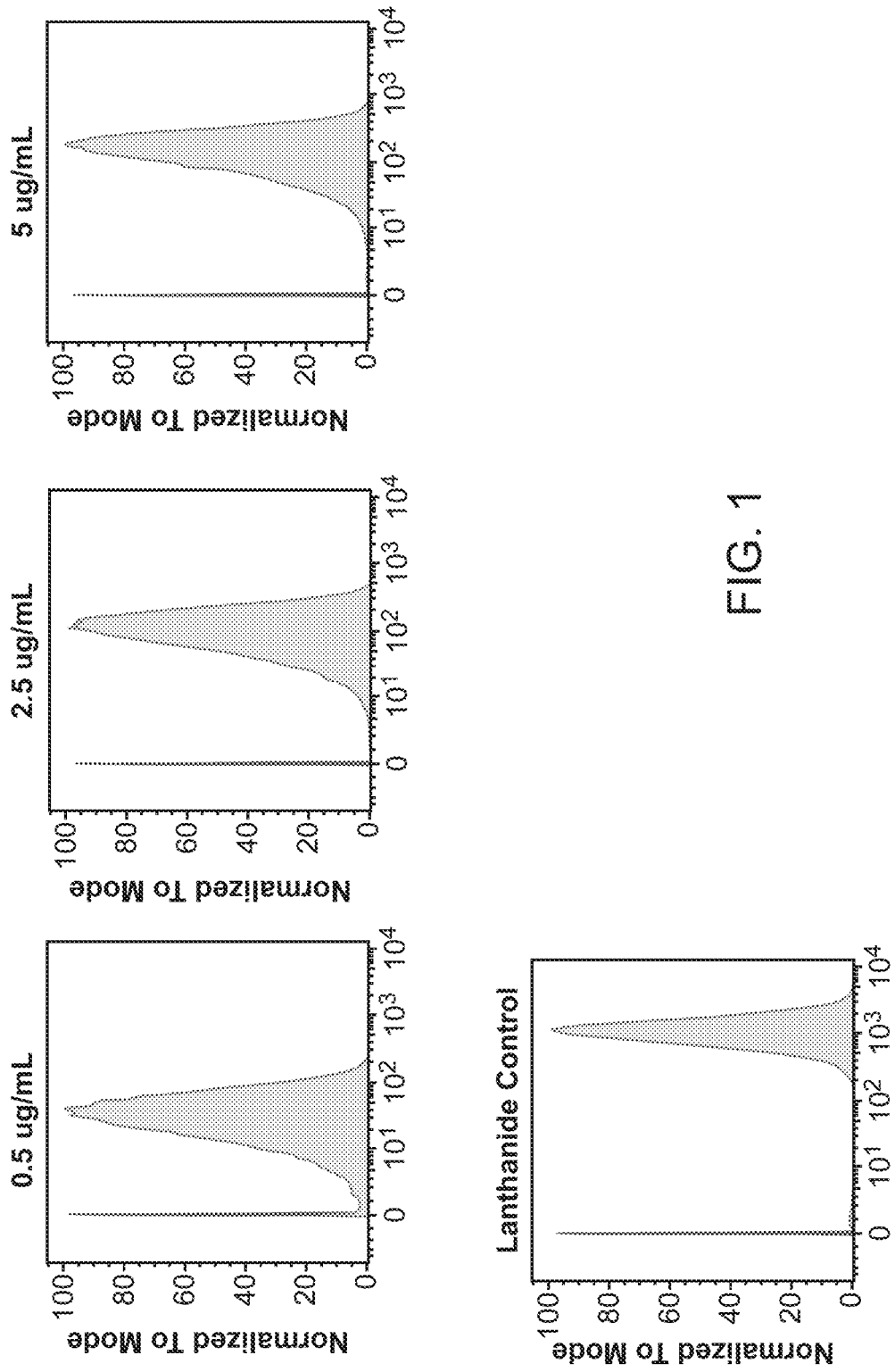
FIG. 1 shows signal over background by comparison of signal between cells positive and negative for expression of a target analyte.

Described herein are reagents and methods for improving signal in imaging mass cytometry. Aspects include mass tags with a large number of labeling atoms, chemical modifications to mass tags and additional reagents to reduce background and/or maintain target binding of mass tagged specific binding partners (SBPs), and schemes for associating a plurality of mass tags with a single SBP. As such, embodiments include any combination of one or more reagents and their use.

The reagents, kits and methods herein may be used for mass cytometry, including imaging mass cytometry. In some aspects, reagents, kits or methods may be used for delivery of a large number of radioisotopes to a target analyte, for example for therapeutic use or radiometric detection. In certain aspects, only non-radioactive isotopes may be used for mass cytometry.

Mass Cytometry

As used herein, mass cytometry is any method of detecting mass tags in a biological sample, such as simultaneously detecting a plurality of distinguishable mass tags with single cell resolution. Mass cytometry includes suspension mass cytometry and imaging mass cytometry (IMC). Mass cytometry may atomize and ionize mass tags of a cellular sample by one or more of laser radiation, ion beam radiation, electron beam radiation, and/or inductively coupled plasma (ICP). Mass cytometry may simultaneously detect distinct mass tags from single cells, such as by time of flight (TOF) or magnetic sector mass spectrometry (MS). Examples of mass cytometry include suspension mass cytometry where cells are flowed into and ICP-MS and imaging mass cytometry where a cellular sample (e.g., tissue section) is sampled, for example by laser ablation (LA-ICP-MS) or by a primary ion beam (e.g., for SIMS).

Mass tags may be sampled, atomized and ionized prior to elemental analysis. For example, mass tags in a biological sample may be sampled, atomized and/or ionized by radiation such as a laser beam, ion beam or electron beam. Alternatively or in addition, mass tags may be atomized and ionized by a plasma, such as an inductively coupled plasma (ICP). In suspension mass cytometry, whole cells including mass tags may be flowed into an ICP-MS, such as an ICP-TOF-MS. In imaging mass cytometry, a form of radiation may remove (and optionally ionize and atomize) portion (e.g., pixels, region of interest) of a solid biological sample, such as a tissue sample, including mass tags. Examples of IMC include LA-ICP-MS and SIMS-MS of mass tagged sample. In certain aspects, ion optics may deplete ions other than the isotope of the mass tags. For example, ion optics may remove lighter ions (e.g., C, N, O), organic molecular ions. In ICP applications, ion optics may remove gas such as Ar and/or Xe, such as through a high-pass quadrupole filter. In certain aspects, IMC may provide an image of mass tags (e.g., targets associated with mass tags) with cellular or subcellular resolution.

Similar to fluorescent immunohistochemistry methods, mass cytometry (including imaging mass cytometry) workflows may include cell (e.g., tissue) fixation and/or permeabilization prior to staining with antibodies and/or other specific binding partners. In contrast to fluorescent methods, in mass cytometry mass tags (e.g., comprising heavy metals not endogenous to the cell) are associated with target analytes through specific binding partners such as antibodies. Imaging mass cytometry, like fluorescent microscopy, may include an antigen retrieval step where the sample is exposed to conditions such as heat to expose target analytes for binding by SBPs. Unbound SBPs are typically washed off before detection of mass tags by mass spectrometry. Of note, other methods of detection such as elemental analysis (e.g., emission spectroscopy or X-ray dispersion spectroscopy) are also within the scope of the subject application.

Additional reagents for mass cytometry include metal-containing biosensor(s) (e.g., that is deposited or bound under conditions such as hypoxia, protein synthesis, cell cycle and/or cell death) and/or metal containing histochemical compound(s) that bind to structures (e.g., DNA, cell membrane, strata) based on chemical properties. In addition, mass tags (e.g., of the subject application or other mass tags) may be combined to provide a unique barcode, so as to label a particular sample or experimental condition prior to pooling with other samples or experimental conditions.

In IMC, a tissue sample may be a section e.g. having a thickness within the range of 1-10 μm, such as between 2-6 μm may be used. In some cases, an ultrathin section less than 500 nm, 200 nm, 100 nm or 50 nm thick may be used, such as sample cut from a resin-embedded tissue block. Techniques for preparing such sections are well known from the field of IHC e.g. using microtomes, including dehydration steps, fixation, embedding, permeabilization, sectioning etc. Thus, a tissue may be chemically fixed and then sections can be prepared in the desired plane. Cryosectioning or laser capture microdissection can also be used for preparing tissue samples. Samples may be permeabilized e.g. to permit of reagents for labelling of intracellular targets. Even after antigen retrieval (e.g., by heating), access to an analyte by an SBP may be sterically hindered. As such, smaller SBPs and certain mass tags may best allow for the SBP to access its target analyte.

To detect RNA, cells in biological samples as discussed herein may be prepared for analysis of RNA and protein content using the methods and apparatus described herein. In certain aspects, cells are fixed and permeabilized prior to the hybridization step. Cells may be provided as fixed and/or permeabilized. Cells may be fixed by a crosslinking fixative, such as formaldehyde, glutaraldehyde. Alternatively or in addition, cells may be fixed using a precipitating fixative, such as ethanol, methanol or acetone. Cells may be permeabilized by a detergent, such as polyethylene glycol (e.g., Triton X-100), Polyoxyethylene (20) sorbitan monolaurate (Tween-20), Saponin (a group of amphipathic glycosides), or chemicals such as methanol or acetone. In certain cases, fixation and permeabilization may be performed with the same reagent or set of reagents. Fixation and permeabilization techniques are discussed by Jamur et al. in "Permeabilization of Cell Membranes" (Methods Mol. Biol., 2010).

Signal Amplification

As used herein in the context of mass cytometry, signal amplification is the association of more than 30, more than 50, more than 100, more than 200, or more than 500 labeling atoms (e.g., of an enriched isotope) with a target analyte (i.e., a single instance of the target analytes bound by a specific binding partner). In certain aspects, labeling atoms may be heavy metals, such as lanthanides or transition metals. In certain aspects, signal amplification may be performed for more than 2, 5, 10 or 20 target analytes. In certain aspects, signal amplification may include use of branched conjugation of a mass tag to SBP, a high sensitivity polymer, a large mass tag particle, a mass tag nanoparticle, and/or a hybridization scheme. In certain aspects, signal amplification uses a mass tag polymer.

As described herein, signal amplification may be by use of mass tags comprising a high number of labeling atoms and/or by association of a larger number of mass tags with a single target analyte (such as through hybridization based signal amplification and/or conjugation of mass tags to SBPs through branched heterofunctional linkers). In certain aspects, a single mass tag may have more than 30, 50, 100, 200, 500, or 1000 labeling atoms. In certain aspects, the hydrodynamic diameter of a mass tag may be low, such as less than 20 nm, less than 15 nm, less than 10 nm, less than 5 nm, less than 3 nm, or less than 2 nm. The hydrodynamic diameter may be less than 1000 $nm^3$, less than 500 $nm^3$, less than 100 $nm^3$, less than 50 $nm^3$, less than 20 $nm^3$, or less than 10 $nm^3$. Techniques such as EM may be used to identify the size, and light scattering may be used to identify the hydrodynamic diameter of mass tags, such as larger mass tags described herein. Further, chromatography methods including as size exclusion and ion exchange (e.g., anion-exchange) chromatography may be used to characterize mass tags, such as smaller mass tags described herein.

Figure 2:
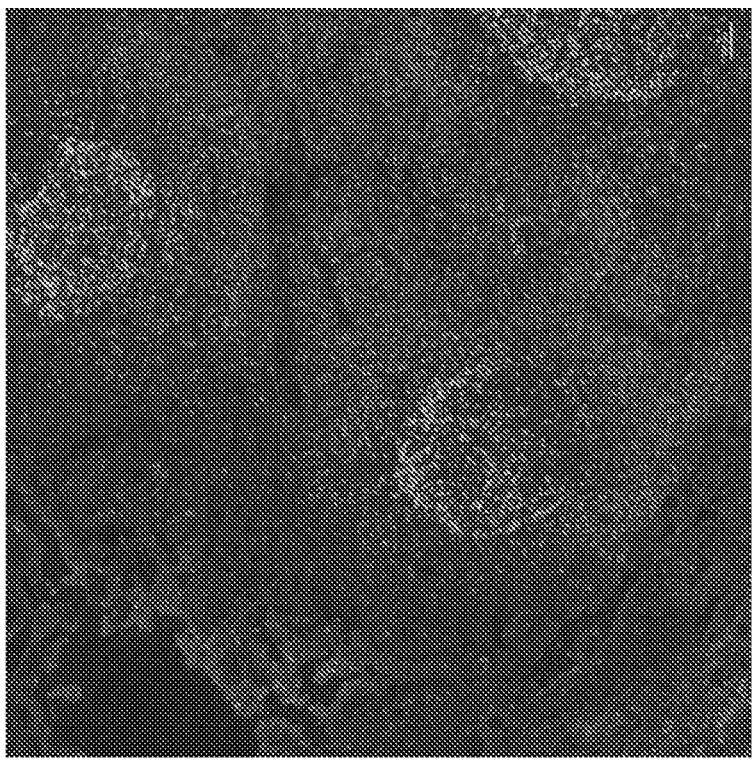
FIG. 2 shows non-specific binding expressed as edge effects in an IMC image.
Figure 2:
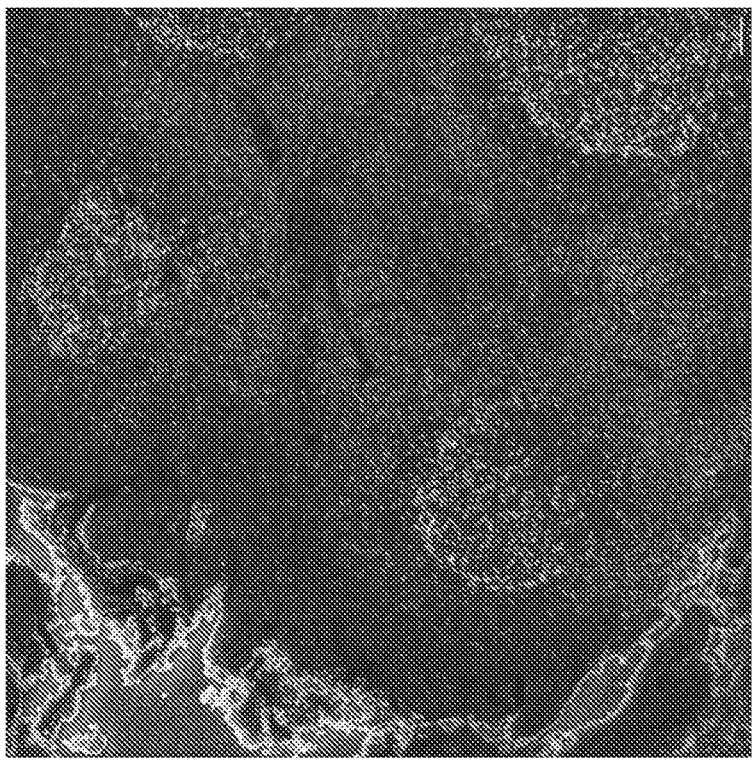

Initial attempts at signal amplification have resulted in non-specific binding (e.g., high background) and disrupted binding of SBPs to target analyte. Mass tags may cause non-specific binding may be a result of low solubility of a polymer, non-specific binding of the polymer to biomolecules or the surface of a slide, and/or steric hindrance of the SBP bound to the mass tag. Such issues may be more pronounced for larger mass tags (e.g., having a large number of labeling atoms) and/or for mass tags with non-lanthanide labeling atoms. The reagents and methods described herein may be valuable for non-lanthanide mass tags, which may require new polymers (e.g., polymers with different chelators used for lanthanides) that may effect solubility and/or result in non-specific binding. Reported herein are signal amplification techniques to amplify signal while maintaining SBP binding to target analyte and/or low non-specific binding. In certain aspects, signal amplification may include maintaining a low background. For example, less than 20%, less than 10%, less than 5%, or less than 1% of signal may be from background (e.g., cells and/or regions of cells that do not express the target analyte) and/or from features such as non-specific puncti and/or edge effects (e.g., as shown in FIG. 2). In certain aspects, the difference between high signal and background may be more than 100 or more than 1000 counts. In certain aspects, more than 10%, more than 20%, more than 50%, or more than 80% of target analyte may be bound by SBPs used in signal amplification methods.

Chelators for loading lanthanides and some non-lanthanide metals may include DOTA, DTPA, EDTA, PEPA and/or derivatives thereof. Alternatively, mass tag polymers may include chelators that preferentially chelate certain non lanthanides, such as DFO and/or sarcophagine.

Inventors have found that the signal amplification and background is variable based on the design of the mass tag polymer, choice of SBP, and combination thereof such that certain SBPs pair better with different mass tags. In addition, general strategies for providing signal amplification and reducing background described herein may be combined to improve signal to noise.

For example, FIG. 1 shows signal over background that is improved by the subject methods and reagents, including for non-lanthanide mass tags that normally have low signal and/or high background (top row) which shows average signal per cell is between 20 and 2000 counts based on the concentration of the mass tagged antibody and type of mass tag, while background (signal from cells negative for the target analyte) remains close to 0 counts. While the data shown is from suspension mass cytometry, similar analysis of imaging mass cytometry data can be performed.

In another example, FIG. 2 shows edge effects from non-specific mass tag polymer binding (left image) which is reduced through the subject methods and reagents (right image).

Branched Mass Tag Conjugation to SBPs Using Heterofunctional Linkers

The development of mass tag polymers, and high sensitivity polymers in particular, benefit from a careful balance between preserving functionality of the antibody and degree of labeling that give high sensitivity. For example, this may be achieved either by attaching low-molecular weight metal-chelating polymers to multiple attachment sites of a biomolecule such as an SBP (e.g. antibody) or attaching larger metal-chelated polymers to fewer-attachment sites on the biomolecule of interest. In certain aspects, multiple mass tags (e.g., mass tag polymers) are attached to the same attachment site of an SBP through branched conjugation, such as through a branched heterofunctional linker described herein.

In certain aspects, excessive labeling of antibodies with low-molecular weight mass tag polymers through the amino groups of the antibody impaired the activity of conjugate. Over-modification of an antibody will damage its specificity. However, inventors have found that attaching a small number of high molecular-weight polymer chains also causes a loss of sensitivity; too big of an antibody-polymer conjugate may lead to steric hindrance between it and the epitopes in the tissue. Branched heterofunctional linker may allow for attachment a larger number of mass tag polymers to an antibody, without damaging the antibody through over-modification and without significant steric hindrance. The linker may contain a mono reactive group in one end to attach to the biomolecule of interest and multiple reactive moieties on the other end to attach to polymers. The linker molecule may contain solubility enhancing groups such as poly ethylene glycol or poly(amidoamine) based dendrimer or branched PEG as a core structure with reactive end group to for covalent bond between the biomolecule and metal-loaded polymers.

This strategy will allow us to generate conjugates with amplified signal, reduced steric hindrance, and site-specific conjugation. Previous mass tagging strategies may only allow attachment of one mass tag per thiol group. An SBP may provide only a limited number of conjugation sites for attachment of a mass tag. For example, an antibody or derivative thereof may only provide a few thiol or amine groups to which a mass tag may be conjugated. A thiol or amine terminated oligonucleotide may only provide one such group.

In certain aspects, a plurality of mass tags (e.g., mass tag polymers) may be conjugated to a smaller number of attachment sites on an SBP. For example, a plurality small branched mass tagged polymers (e.g., bound to, or capable of binding, less than 30, or less than 20 labeling atoms) may be attached to a single attachment site through a branched heterofunctional linker. Such smaller polymers may be easier to synthesize (e.g., at a uniform size), and the size and shape of the branched heterofunctional linker bound to mass tag polymers may be controlled through the heterofunctional chemistry of the linker.

Alternatively, a plurality of high sensitivity polymers, as described herein, may be bound through a single branched heterofunctional linker. For example, 6 or more mass tags may be bound to 3 or fewer attachment sites, 4 or more mass tags may be bound at 2 attachment sites, or 2 or more mass tags may be bound at a single attachment site. For example, a heterofunctional linker may comprise a first group that binds to (e.g., covalently binds) an SBP attachment site and a plurality of instances of a second group that binds to (e.g., covalently binds a chemically different attachment site on a mass tag. For example, the heterofunctional linker may branch into 2, 3, 4 or more instances of the second group.

Branched heterofunctional linkers may be formed through a $3^{rd}$ type of chemistry (e.g., that is unreactive with the attachment chemistry of either end of the linker). For example, a branched heterofunctional linker may be formed through aldehyde chemistry, and may have a thiol reactive group for attachment to an SBP, and may have a plurality of instances of a click chemistry group (such as a strain promoted click chemistry group) for attachment to a plurality of mass tags. Branched heterofunctional linkers may have 2, 3, 4, at least 2, at least 3, or at least 4, branches each terminating in a second reactive groups (for attachment to mass tags).

Heterofunctional linkers have two different attachment mechanisms. A first attachment may be may be for binding to an attachment site of an SBP, such as a thiol or amine group. A second attachment mechanism may be for binding to a mass tag, such as through click chemistry. A branched heterofunctional linker may have a plurality of ends for the second attachment chemistry. Branching provided by the branched heterofunctional linker may reduce the need to synthesize a large mass tag polymer (e.g., having, or capable of binding, more than 30, more than 50, or more than 100 labeling atoms). Binding may be covalent binding, such as through thiol-reactive chemistry, amine reactive chemistry, or click chemistry (such as strain promoted click chemistry). Binding may be non-covalent, such as through hybridization or through an affinity interaction (for example, biotin-avidin or an antibody or derivative thereof with a target analyte such as a peptide sequence).

One or both attachment mechanisms of the branched heterofunctional linker may be covalent. In certain aspects, a heterofunctional linker may have a thiol-reactive first group (e.g., a maleimide) and a plurality of instances of a click chemistry reactive second group (e.g., TCO or DBCO). An antibody may be reduced (e.g., by TCEP) to present thiol groups, and reacted with the first group of the heterofunctional linker. In certain aspects, TCEP reduction cuts an antibody SBP up into smaller fragments, thus resulting in smaller, less sterically-hindered conjugates better able to reach epitopes in the tissue. Such antibody fragments bound to a plurality of mass tags may be more easy to purify, such as by spin filtration opposed to FPLC. A plurality of mass tags, such as a mass tag polymers, each functionalized with a click chemistry reactive group (e.g., tetrazine or azide) may be attached to the second group of the heterofunctional linker. This invention involves modification of antibodies with multiple DBCO moieties at the hinge region for site specific attachment of azide-functionalized MCPs. Use of a branched heterofunctional linker may involve a two-step conjugation strategy where a disulfide-bond at hinge-region of an antibody is partially reduced to produce reactive thiol-groups, which is subsequently react with the maleimide functional groups of the branched multi-functional linker. Then, azide or tetrazine functionalized polymers branching from the heterofunctional linker may be attached to a DBCO or TCO moiety using the copper-free click chemistry procedure. Similarly, other multi-functional groups and different attaching chemistry can be designed and used in different applications where improved signal amplification, conjugation efficiency is needed=As a branched structure, 2nd or 3rd generation dendrimers can also be used for introduction of multiple mass tag attachment sites on the branched heterofunctional linker.

In certain aspects, an attachment mechanism of the branched heterofunctional linker may be non-covalent. For example, the linker may have branching oligonucleotides (e.g., single stranded DNA of the same or similar sequence) covalently bound to a polymer backbone of the linker, and a mass tagged oligonucleotide may be hybridized, directly or indirectly, to the branching oligonucleotides. Such hybridization may be done after contacting a sample with an SBP bound to the branched heterofunctional linker, since the hybridization scheme could target different labeling atoms to different SBPs as discussed further herein. In certain aspects, a non-covalent attachment of the branched heterofunctional linker to an SBP may be through an affinity reaction, such as biotin-avidin or binding of a secondary antibody to a primary antibody SBP.

The heterofunctional linker may include a long linker (e.g., more than 5, 10 or 20 repeating subunits) between the first group and a branching point and/or between the branching point and second groups. The subunits may include solubility enhancing (e.g., polar) subunits such as polyethylene glycol (PEG).

In certain aspects, an SBP may first be attached to one or more heterofunctional linkers, after which mass tags are attached. Heterofunctional linkers may better access an SBP attachment site when unencumbered by mass tags that can be attached later.

Conjugation of Mass Tags and/or Linkers

A variety of suitable conjugation means are known in the art. For example, a mass tag may be conjugated to a biologically active material, such as through covalent binding (e.g., amine chemistry, thiol chemistry, phosphate chemistry, an enzymatic reaction, a redox reaction (such as with a metal halide), and affinity intermediate (e.g., streptavidin or biotin), or a form of click chemistry such as strain promoted click chemistry or metal-catalyzed click chemistry). In certain aspects, the conjugation methods described herein may be used to conjugate an oligonucleotide to an SBP, such as when a hybridization scheme is used to indirectly associate mass tagged oligonucleotides with an SBP-oligonucleotide conjugate.

A mass tag may be conjugated to a biologically active material, such as through covalent binding (e.g., amine chemistry, thiol chemistry, phosphate chemistry, an enzymatic reaction, or a form of click chemistry such as strain promoted click chemistry or metal-catalyzed click chemistry). The biologically active material may be an affinity reagent (such as an antibody or fragment thereof, aptamer, lectin, and so forth) or an oligonucleotide probe that hybridizes to an endogenous target (e.g., DNA or RNA) or an intermediate (e.g., antibody-oligonucleotide intermediate and/or a hybridization scheme of oligonucleotides). As described herein, suitable attachment chemistries may include carboxyl-to-amine reactive chemistry (e.g., such as reaction with carbodiimide), amine-reactive chemistry (e.g., such as reaction with NHS ester, imidoester, pentafluorophenyl ester, hydroxymethyl phosphine, etc.), sulfhydryl reactive chemistry (e.g., such as reaction with maleimide, haloacetyl (Bromo- or Iodo-), pyridyldisulfide, thiosulfonate, vinylsulfone, etc.), aldehyde reactive chemistry (e.g., such as reaction with hydrazide, alkoxyamine, etc.), hydroxyl reactive chemistry (e.g., such as reaction with isothiocyanate). Alternative method of attachment include click chemistry, such as strain promoted click chemistry (such as by DBCO-azide or TCO-tetrazine).

The polymer may be functionalized to bind a biologically active material. In certain aspects, the polymer may be functionalized through thiol reactive chemistry, amine reactive chemistry or click chemistry. For example, the polymer may be functionalized for thiol reactivity (e.g., via a maleimide group to attach to thiol groups on the Fc portion of an antibody that is reduced, e.g., by TCEP reduction). The type of conjugation, and conjugation conditions (e.g., concentration of a reducing agent) may be different based on the type of SBP to maintain integrity of the SBP.

For example, a polymer mass tag (e.g., comprising a plurality of metal binding groups, such as metal chelating pendant groups) may be functionalized with a thiol reactive group such as maleimide. In certain aspects, an SBP may comprise cysteines that may be reduced (e.g., by TCEP reduction) to provide thiols for conjugation to the polymer. However, the cysteines on the SBP may not be accessible, disruption of the cysteine may reduce the affinity of the SBP, or the reduction step may reduce the affinity of the SBP. In such cases, other functional groups on the SBP may be thiolated prior to conjugation, even on an SBP that already comprises thiols or cysteines. For example, a recombinant antibody may be designed to be smaller (e.g. to reduce steric hindrance and thereby improve binding), and may therefore not have an accessible cysteine on the Fc region. In such cases, amines may be indirectly thiolated, such as by reaction with succinimidyl acetylthioacetate followed by removal of the acetyl group with 50 mM hydroxylamine or hydrazine. In another example, amines can be indirectly thiolated by reaction with succinimidyl 3-(2-pyridyldithio) propionate followed by reduction of the 3-(2-pyridyldithio) propionyl conjugate with DTT or TCEP. Reduction releases the 2-pyridinethione chromophore, which can be used to determine the degree of thiolation. Alternatively, thiols can be incorporated at carboxylic acid groups by an EDAC-mediated reaction with cystamine, followed by reduction of the disulfide with DTT or TCEP. Finally, tryptophan residues in thiol-free proteins can be oxidized to mercaptotryptophan residues, which can then be conjugated to a mass tag comprising an iodoacetamide or maleimide. In certain aspects, the reduction step described for thiolation may be skipped or may be less stringent than would be needed for conjugation to a thiol of a reduced cysteine, such that a maleimide functionalized mass tag polymer is conjugated to the thiolated moiety and not at a reduced cysteine of the SBP. In certain aspects, a non-peptide based SBP (such as an oligonucleotide) may be more resilient, and conjugation may include reduction at a TCEP or DTT concentration at or above 25 mM or at or above 50 mM. In certain aspects, a conjugation of a non-peptide based SBP may include harsher temperatures, such as denaturation through heat or freezing.

In certain aspects, the SBP (such as an oligonucleotide or peptide) may be small, such as within 50% of the size of a polymer mass tag. This may provide better tissue penetration and/or reduced steric hinderance, but may complicate purification of mass tagged SBP in a filtering step. As such, the mass tag may be modified to present an epitope that can allow affinity based purification. In certain aspects, A variety of different metal-catalyst free click chemistry reactions, such as strain promoted reactions, can be used according to certain aspects of the present disclosure.

Alkyne Reaction with Azide

A first example is the reaction between a strained alkyne and an azide, such as a strain promoted azide-alkyne cycloaddition between a cyclooctyne derivative and an azide.

Here, reaction of the cyclooctyne and azide covalently links the $R_1$ and $R_2$ groups. Given the alkyne ring strain, the reaction of an organic azide with a cyclic alkyne, typically cyclooctyne, has become commonly known as strain-promoted azide-alkyne cycloaddition (SPAAC). In certain aspects of the present disclosure, $R_1$ may be the SBP and $R_2$ may be the mass tag. Alternatively, $R_2$ may be the SBP and $R_1$ may be the mass tag. Accordingly, in some embodiments of the present disclosure, the method comprises conjugating an SBP to a mass tag using a click chemistry reaction, wherein the click chemistry reaction is a reaction of an azide with an alkyne.

Reaction with of a cyclooctyne with an azide is characterised by relatively slow reaction kinetics, and requires large excesses of reagents, and long incubation times. Accordingly, cycloalkyne derivatives can be used which have greater reactivity, but without a compromise in reactivity. These include monofluorinated cyclooctyne (MOFO), difluorocyclooctyne (DIFO), dimethoxyazacyclooctyne (DIMAC), dibenzocyclooctyne (DIBO), dibenzoazacyclooctyne (DIBAC), biarylazacyclooctynone (BARAC), bicyclononyne (BCN), 2,3,6,7-tetramethoxy-DIBO (TMDIBO), sulfonylated DIBO (S-DIBO), carboxymethylmonobenzocyclooctyne (COMBO), pyrrolocyclooctyne (PYRROC). It is commonly understood that the enhanced reactivity of (di)benzoannulated cyclooctynes is caused by the increase in ring strain imparted by the multiple sp2-hybridized carbons. Many kinds of dibenzocyclootyne (DBCO) derivatives can be used in the present disclosure, such as those derivatised (directly or via a linker) with NHS esters, such as for conjugation to amines on the SBP (e.g. the N-terminus amine group, of the amine groups of the side chains of lysine, arginine, and histidine in proteins (e.g. antibodies and lectins), conjugation to amino modified oligonucleotide probes (as commercially available from IDT (IL, USA), Sigma Aldrich (MO, USA), Bio-Synthesis, Inc. (TX, USA) inter alia), amino sugar derivatives etc.). Alternatively, the DBCO derivative may be derivatised (directly or via a linker) with a maleimide (e.g., dibenzocyclooctyne-maleimide; Sigma Aldrich Catalog number 760668, or Dibenzocyclooctyne-PEG4-maleimide; Sigma Aldrich Catalog number 760676). The maleimide functionality can be used to couple the DBCO to a sulfhydryl group of the mass tag.

Accordingly, in some embodiments the alkyne is a cyclic alkyne, for instance wherein the cyclic alkyne is part of an 8-membered ring. The cyclic alkyne may be strained. Sometimes, the cyclic alkyne is part of a multi-ring structure that comprises 3 or more rings, optionally wherein the multi ring structure comprises at least two benzene rings. In some embodiments, the cyclic alkyne is dibenzocyclooctyne (DBCO).

The azide likewise can be coupled to the SBP (directly or via a linker) with NHS esters, such as azido-dPEG$_8$-NHS ester, azido-dPEG$_{12}$-NHS ester etc. (available from Sigma Aldrich; cat nos. QBD10503 and QBD10505, respectively). Via the NHS ester, the azide can be coupled to amines on the SBP (e.g., the N-terminus amine group, of the amine groups of the side chains of lysine, arginine, and histidine in proteins (e.g., antibodies and lectins), conjugation to amino modified oligonucleotide probes (as commercially available from IDT (IL, USA), Sigma Aldrich (MO, USA), Bio-Synthesis, Inc. (TX, USA) inter alia), amino sugar derivatives etc.). Alternatively, azide modified oligonucleotides/sugars can be synthesised directly (i.e., without need to attach the azide functionality via a separate NHS ester reaction to an amino modified). The azide component can also be coupled to the mass tag. For instance, azo initiators of polymerisation may be used in conventional polymerisation reactions. Azide terminated polymethacrylate is also available from Sigma Aldrich.

Accordingly, certain aspects of the present disclosure provide a series of methods of producing a mass-tagged SBP, comprising conjugating the mass tag and the SBP via a SPAAC reaction. In some embodiments, the method comprises the steps of providing an alkyne functionalised SBP and an azide functionalised mass tag, and reacting the alkyne functionalised SBP with the azide functionalised mass tag, such as wherein the alkyne functionalised SBP is functionalised with a strained cycloalkyne, for example DBCO. In some embodiments, the method comprises the steps of providing an azide functionalised SBP and an alkyne functionalised mass tag, and reacting the azide functionalised SBP and the alkyne functionalised mass tag, such as wherein the alkyne functionalised mass tag is functionalised with a strained cycloalkyne, for example DBCO. As noted below, a spacer may be presented between the SBP and the alkyne or azide and/or the mass tag and azide or alkyne.

Certain aspects of the present disclosure also provide a mass-tagged SBP, wherein the SBP and the mass tag are joined by a linker which comprises the reaction product of an alkyne and an azide, such as a strained cycloalkyne and an azide, for example DBCO and an azide. In some instances the reaction product is the product of a metal free click chemistry reaction, such as a copper free click chemistry reaction. Accordingly, certain aspects of the present disclosure provide a mass-tagged SBP wherein the SBP and the mass tag are joined by a linker comprising a triazole. The triazole group in the linker may be part of a multi-ring structure. In certain aspects, the multi-ring structure may comprise 4 or more rings. For example, the multi-ring structure may be a 3 member ring, a 4 member ring, a 5 member ring, a 6 member ring, 7 member ring, an 8 member ring, a 9 member ring, a 10 member ring, and so forth. In certain aspects, the multi-ring structure may comprise two or more benzene rings. Specifically, the multi-ring structure may comprise a dibenzocyclooctene group. The triazole group and the dibenzocyclooctene group may be in any orientation. For example, the triazole group may be separated from the SBP by the dibenzocyclooctene group (thus meaning the dibenzocyclooctene group would be separated from the mass tag by the triazole group). Alternatively, the dibenzocyclooctene group may be separated from the SBP by the triazole group (thus meaning the triazole group would be separated from the mass tag by the dibenzocyclooctene group).

As explained below, the mass tag comprises one or more labelling atoms, which allow presence identification of the target of the SBP in a simple manner in a mass detector. However, it is not the case that the SBP will be conjugated to a mass tag with the labelling elements already in the tag. Sometimes, SBP will be conjugated to a metal chelating moiety before one or more metal labelling atoms are loaded onto the metal-chelating moiety to form a mass tag. As explained below in more detail, the metal chelating moiety may be a single metal-chelating group or it may be a polymer to which a metal-chelating group has been attached to two or more subunits.

Accordingly, certain aspects of the present disclosure provide a series of methods of producing an SBP conjugated to a metal-chelating moiety, comprising conjugating the metal-chelating moiety and the SBP via a SPAAC reaction. In some embodiments, the method comprises the steps of providing an alkyne functionalised SBP and an azide functionalised metal-chelating moiety, and reacting the alkyne functionalised SBP with the azide functionalised metal-chelating moiety, such as wherein the alkyne functionalised SBP is functionalised with a strained cycloalkyne, for example DBCO. In some embodiments, the method comprises the steps of providing an azide functionalised SBP and an alkyne functionalised metal-chelating moiety, and reacting the azide functionalised SBP and the alkyne functionalised metal-chelating moiety, such as wherein the alkyne functionalised metal-chelating moiety is functionalised with a strained cycloalkyne, for example DBCO. As noted below, a spacer may be presented between the SBP and the alkyne or azide and/or the metal-chelating moiety and azide or alkyne.

The SPAAC reaction may be performed under physiological conditions, and is compatible with macro-biomolecules such as proteins (including, antibodies, ligands, receptors, nucleic acids etc., as described herein below, including in the sections relating to SBPs). Physiological conditions may include an isotonic solution or biological buffer such as saline, phosphate buffered saline (PBS), and the like. Physiological conditions may alternatively or additionally include a temperature ranging from 1° C. to 42° C., 4° C. to 37° C., 4° C. to 25° C., 10° C. to 37° C., 25° C. to 37° C., and so forth. Physiological conditions may include a neutral pH, a pH of 5.5 to 8.5, a pH of 6 to 8, a pH of 6.5 to 7.5, and so forth. Because the reaction between DBCO and azide may be a slow process, a relatively long incubation time may be preferable. For example, the conjugation of step b) may be conducted for 4 to 48 hours at 4° C., 10 to 24 hours at 4° C., 18 to 20 hours at 4° C., 10 minutes to 10 hours at room temperature, 30 minutes to 5 hours at room temperature, 30 minutes to 3 hours at room temperature, 5 minutes to 5 hours at 37° C., 10 minutes to 2 hours at 37° C., and so forth.

Certain aspects of the present disclosure also provide a method of making a mass-tagged SBP comprising performing a method according to the previous paragraph to produce an SBP conjugated to a metal-chelating moiety, and further comprising the step of loading metal on to the metal-chelating moiety, e.g. polymer.

Certain aspects of the present disclosure also provide a SBP-metal-chelating moiety conjugate, wherein the SBP and the metal-chelating moiety are joined by a linker which comprises the reaction product of an alkyne and an azide, such as a strained cycloalkyne and an azide, for example DBCO and an azide. In some instances the reaction product is the product of a metal free click chemistry reaction, such as a copper free click chemistry reaction. Accordingly, certain aspects of the present disclosure provide a SBP-metal-chelating moiety conjugate wherein the SBP and the metal-chelating moiety are joined by a linker comprising a triazole. The triazole group in the linker may be part of a multi-ring structure. In certain aspects, the multi-ring structure may comprise 4 or more rings. For example, the multi-ring structure may be a 3 member ring, a 4 member ring, a 5 member ring, a 6 member ring, 7 member ring, an 8 member ring, a 9 member ring, a 10 member ring, and so forth. In certain aspects, the multi-ring structure may comprise two or more benzene rings. Specifically, the multi-ring structure may comprise a dibenzocyclooctene group. The triazole group and the dibenzocyclooctene group may be in any orientation. For example, the triazole group may be separated from the SBP by the dibenzocyclooctene group (thus meaning the dibenzocyclooctene group would be separated from the metal-chelating moiety by the triazole group). Alternatively, the dibenzocyclooctene group may be separated from the SBP by the triazole group (thus meaning the triazole group would be separated from the metal-chelating moiety by the dibenzocyclooctene group).

The mass-tagged SBP comprising a triazole group may be stable in solution. For example, the SBP-mass tag may be stable in solution for up to a week, a month, 6 months, a year, 2 years, 5 years and so forth. The SBP-mass tag may be stable in solution at −20° C. (e.g., wherein the solution comprises glycerol), below freezing, 4° C., 10° C., or at room temperature. Where the SBP is an antibody, stability may be measured by antibody affinity.

In some instances, the click chemistry reaction proceeds in the absence of a metal catalyst, in particular wherein the click chemistry reaction proceeds in the absence of copper or iron. In some instances, the click chemistry reaction is performed under physiological conditions, optionally wherein the click chemistry reaction is performed at a pH from 6 to 8, such as wherein the click chemistry reaction is performed in a buffer, for example wherein the buffer is isotonic.

Sometimes, the alkyne is attached to the SBP and the azide is attached to the mass tag or metal-chelating moiety. Sometimes, the azide is attached to the SBP and the alkyne is attached to mass tag or the metal-chelating moiety. Sometimes, where the alkyne is attached to the SBP, it is attached by a linker component (optionally via a spacer). Sometimes, where the alkyne is attached to the mass tag or metal-chelating moiety, it is attached by a linker component (optionally via a spacer). Sometimes, where the azide is attached to the SBP, it is attached by a linker component (optionally via a spacer). Sometimes, where the azide is attached to the mass tag or metal-chelating moiety, it is attached by a linker component (optionally via a spacer).

Alkene Reaction with Tetrazine

A second example is the reaction between a strained alkene and a tetrazine, such as a strain promoted tetrazine-alkene cycloaddition between a trans-cyclooctene derivative and a tetrazine.

Here, reaction of the trans-cyclooctene and tetrazine covalently links the $R_1$ and $R_2$ groups. Given the alkyne ring strain, the reaction of an organic tetrazine with a cyclic alkene, typically trans-cyclooctene, in an inverse electron demand Diels-Alder cycloaddition (iEDDA). In certain aspects of the present disclosure, $R_1$ may be the SBP and $R_2$ may be the mass tag. Alternatively, $R_2$ may be the SBP and $R_1$ may be the mass tag.

Among three different possible tetrazine isomers, 1,2,4,5-tetrazine is used for the iEDDA reaction. The completion of the reaction releases $N_2$ gas as the only by-product, which makes the iEDDA reaction irreversible and more suitable for bio-labelling than conventional reversible Diels-Alder reactions.

Trans-cyclooctene (TCO) is currently one of the most reactive cyclic alkenes known as a reagent in this reaction. Many kinds of derivatives can be used in certain aspects of the present disclosure, such as those derivatised (directly or via a linker) with NHS esters, such as for conjugation to amines on the SBP (e.g. lysine). Alternatively, the TCO derivative may be derivatised (directly or via a linker) with a maleimide (e.g. the N-terminus amine group, of the amine groups of the side chains of lysine, arginine, and histidine in proteins (e.g. antibodies and lectins), conjugation to amino modified oligonucleotide probes (as commercially available from IDT (IL, USA), Sigma Aldrich (MO, USA), Bio-Synthesis, Inc. (TX, USA) inter alia), amino sugar derivatives etc.). The maleimide functionality can be used to couple the TCO to a sulfhydryl group of the mass tag. trans-bicyclo[6.1.0]nonene derivatives can also be used, with the substitution occurring on the cyclopropyl ring. Although less rapid than TCO, methylcyclopropene, bicyclo [6.1.0]nonyne, cyclooctyne and norbornene can also be reacted with tetrazines.

The tetrazine likewise can be coupled to the SBP (directly or via a linker) with NHS esters (such as available from Sigma Aldrich). Via the NHS ester, the tetrazine can be coupled to amines on the SBP (e.g. the N-terminus amine group, of the amine groups of the side chains of lysine, arginine, and histidine in proteins (e.g. antibodies and lectins), conjugation to amino modified oligonucleotide probes (as commercially available from IDT (IL, USA), Sigma Aldrich (MO, USA), Bio-Synthesis, Inc. (TX, USA) inter alia), amino sugar derivatives etc.). The tetrazine component can also be coupled to the mass tag, e.g. where the component also comprises a maleimide functionality. There are two main types of tetrazines that are widely applied: 6-methyl-substituted tetrazines and 6-hydrogen-substituted tetrazines. Methyl-substituted tetrazines exhibit a high stability even when dissolved in aqueous media, while still offering faster reaction kinetics with TCO derivatives than any other bioorthogonal reaction pairs (approx. 1000 $M^{-1}$ $s^{-1}$). Moreover, they tolerate a wide array of reaction conditions. This makes them the prime choice for applications like protein labelling. Hydrogen-substituted tetrazines, on the other hand, show lower stability and less tolerance to harsh reaction conditions, but offer extremely fast reaction kinetics (up to 30000 $M^{-1}$ $s^{-1}$) for applications like in vivo imaging. The tetrazine can be 3-(benzylamino)-tetrazine.

Accordingly, certain aspects of the present disclosure provide a series of methods of producing a mass-tagged SBP, comprising conjugating the mass tag and the SBP via an inverse electron-demand Diels-Alder cycloaddition reaction between a strained alkene and a tetrazine (which is followed by a retro-Diels-Alder reaction under elimination of $N_2$). In some embodiments, the method comprises the steps of providing an alkene functionalised SBP and a tetrazine functionalised mass tag, and reacting the alkene functionalised SBP with the tetrazine functionalised mass tag, such as wherein the alkene functionalised SBP is functionalised with a strained cycloalkene, for example TCO. In some embodiments, the method comprises the steps of providing an tetrazine functionalised SBP and an alkene functionalised mass tag, and reacting the tetrazine functionalised SBP and the alkene functionalised mass tag, such as wherein the alkene functionalised mass tag is functionalised with a strained cycloalkene, for example TCO. As noted below, a spacer may be presented between the SBP and the alkene or tetrazine and/or the mass tag and tetrazine or alkene.

Certain aspects of the present disclosure also provide a mass-tagged SBP, wherein the SBP and the mass tag are joined by a linker which comprises the reaction product of an alkene and a tetrazine, such as a strained cycloalkene and a tetrazine, for example TCO and a tetrazine. In some instances the reaction product is the product of a metal free click chemistry reaction, such as a copper free click chemistry reaction. Accordingly, certain aspects of the present disclosure provide a mass-tagged SBP wherein the SBP and the mass tag are joined by a linker comprising a pyridazine. The pyridazine group in the linker may be part of a multi-ring structure. In certain aspects, the multi-ring structure may comprise 2 or more rings. For example, the multi-ring structure may be a 3 member ring, a 4 member ring, a 5 member ring, a 6 member ring, 7 member ring, an 8 member ring, a 9 member ring, a 10 member ring, and so forth. In certain aspects, the multi-ring structure may comprise a 6 member ring and an 8 member ring. Specifically, the multi-ring structure may comprise a cycylooctane group. The pyridazine group and the cyclooctane group may be in any orientation. For example, the pyridazine group may be separated from the SBP by the cyclooctane group (thus meaning the cyclooctane group would be separated from the mass tag by the pyridazine group). Alternatively, the cyclooctane group may be separated from the SBP by the pyridazine group (thus meaning the pyridazine group would be separated from the mass tag by the cyclooctane group).

SBPs and Small Moieties as SBPs

As used herein, and SBP is a specific binding partner (or specific binding pair). An SBP may bind its target analyte non-covalently, such as through affinity (e.g., tertiary structure) or hybridization. Accordingly, certain aspects of the present disclosure also provide kits for labelling SBPs, and also kits of mass-tagged SBPs generated by the click chemistry disclosed herein, optionally kits comprising of mass-tagged SBPs and also other labelling atom containing reagents, for instance DNA intercalators. Likewise, certain aspects of the present disclosure also provide a method of labelling a sample using a mass tagged SBP of the disclosure, optionally are methods of labelling a sample using multiple such mass tagged SBPs, for example wherein the mass-tagged SBPs include SBPs of different types, for instance an antibody SBP (including multiple antibody SBPs), a nucleic acid SBP (including multiple nucleic acid SBPs), a lectin (including multiple lectins), a sugar (including multiple sugars) and a DNA intercalator (including multiple DNA intercalators). Similarly, certain aspects of the present disclosure include use of a mass tagged SBP of the disclosure for labelling a sample, such as the use of multiple such mass tagged SBPs for labelling a sample, for example wherein the mass-tagged SBPs include SBPs of different types, for instance an antibody SBP (including multiple antibody SBPs), a nucleic acid SBP (including multiple nucleic acid SBPs), a lectin (including multiple lectins), a sugar (including multiple sugars) and a DNA intercalator (including multiple DNA intercalators). Accordingly, certain aspects of the present disclosure also provide a sample labelled according to the disclosure, such as a sample labelled with a mass tagged SBP of the disclosure, optionally a sample labelled with multiple such mass tagged SBPs, for example wherein the mass-tagged SBPs include SBPs of different types, for instance an antibody SBP (including multiple antibody SBPs), a nucleic acid SBP (including multiple nucleic acid SBPs), a lectin (including multiple lectins), a sugar (including multiple sugars) and a DNA intercalator (including multiple DNA intercalators).

In certain aspects, an SBP may be a derivative on an antibody (such as an antibody fragment or synthetic antibody), nucleic acid aptamers, and non-immunoglobulin protein (e.g., avidin), peptides (e.g., matching or derived from binding domains of a protein such as a zinc finger that binds nucleic acids or a receptor binding domain that binds a small peptide or molecule, and so forth) or their corresponding analytes. In such cases, the SBP may be a small moiety, smaller than a traditional antibody. For example, a small moiety SBP may be less than 50, less than 30, less than 20, less than 10, or less than 5 kDa in molecular weight. A small moiety SBP may allow for a larger mass tag without drawbacks discussed herein. A small moiety SBP may better permeate a cell or tissue, for example allowing for deeper staining of a tissue.

Different SBPs may be impacted differently by conjugation method and mass tag. As such, aspects of the invention include use of different signal amplification methods for different SBPs in analysis of the same sample. The different SBPs may be different types of SBPs (e.g., oligonucleotides vs antibodies), different antibody isotypes (IgM, and different isotypes like IgG1, IgG2a, and IgG2b), or the same SBP type but with different target analytes. Different conjugation methods include different stringency of reduction when thiol-reactive chemistry is used to conjugate SBPs to mass tags. Different mass tags include different high sensitivity polymers (e.g., having different chelating groups, polymer sizes, polymer shapes, and/or different composition of solubility enhancing groups). For example, a higher stringency conjugation (e.g., reduction) may be used for SBPs that present fewer attachment sites (e.g., thiol groups). Kits of the subject application include a plurality of different SBPs conjugated to mass tags having different polymeric structures (e.g., in addition to having different labeling atoms).

In certain aspects, different SBPs (including different antibody immunoglobulin classes) may be conjugated to different mass tags, or may be conjugated under different conditions to chemically identical or similar mass tags. For example, when thiol-reactive chemistry is used, certain antibodies may respond differently to reduction (e.g., by TCEP). As such, a plurality of SBPs may be conjugated to the same mass tag polymer structure (potentially loaded with different isotopes) by different conjugation protocols.

Small moiety SBPs that are mass tagged may be purified by methods other than FPLC, such as by spin filtration. In certain aspects, a mass tag (or total amount of mass tags) bound to an SBP may be at least 20%, 30%, 50%, or 80% of the size of the SBP itself, which may allow for spin filtration. In certain aspects, mass tagged antibodies may be purified by spin filtration.

Mass Tag Polymers, Including High Sensitivity Polymers

Mass tags of the subject application include polymers comprising a plurality of labeling atoms, for example loaded on metal chelating pendant groups or incorporated into a backbone of the polymer. In certain aspects, mass tagged polymers may be provided separately from an elemental or isotopic composition (e.g., that can be loaded onto chelators of the mass tag polymer, or that is already loaded onto chelators of the mass tag polymer). Mass tagged polymers may be provided attached to a specific binding partner (SBP) such as an antibody or fragment thereof. In certain aspects, a mass tag polymer may have, or may be capable of binding (e.g., through chelation), more than 10, more than 20, more than 30, more than 50, more than 100, or more than 200 labeling atoms (e.g., of a single isotope, such as an enriched isotope). High sensitivity polymers may have, or may be capable of binding (e.g., on average) more than 30, more than 50, more than 100, or more than 200 labeling atoms.

High sensitivity polymers may be linear or branched. A branched polymers may be a dendritic polymer (e.g., comprising at least second, third, or fourth generation branches) or a star polymer (e.g., comprising at least three linear polymers spreading from a central core).

In certain aspects, high sensitivity polymers may include solubility enhancing pendant groups (e.g., having polar groups such as PEG) that do not have a chelator, in addition to metal chelating pendant groups.

High sensitivity mass tag polymers (i.e., high sensitivity polymers) having a large number (e.g., more than 30) of labeling atoms may present a number of difficulties, including steric hinderance of SBP binding to target, poor attachment to SBPs, low solubility, and non-specific binding to the sample or underlying substrate. In certain aspects, mass tag polymers having a large number of labeling atoms may have chemical modification to reduce or eliminate one or more of these trade-offs.

In certain aspects, the density of labeling atoms in a mass tag polymer may be increased by coupling a plurality of metal chelating groups in a single pendant group of the polymer.

In certain aspects, the hydrodynamic diameter of a high sensitivity polymer may be low, such as less than 20 nm, less than 15 nm, less than 10 nm, less than 5 nm, less than 3 nm, or less than 2 nm. The hydrodynamic diameter may be less than 1000 $nm^3$, less than 500 $nm^3$, less than 100 $nm^3$, less than 50 $nm^3$, less than 20 $nm^3$, or less than 10 $nm^3$.

To reduce steric hindrance, high sensitivity polymers may be spaced from the SBP by a long linker, such as a linker (free of labeling atoms or metal chelating pendant groups) comprising more than 10, more than 20, more than 30, or more than 50 chemical bonds along a linear chain.

Solubility enhancing groups (e.g., non-ionic polar groups such as PEG groups) may be included in the polymer structure, e.g., such that a mass tag polymer has more than 5, more than 10, or more than 20 of such groups. Solubility enhancing groups can be organized along a linear chain, such as a linker, polymer backbone, and/or on pendant groups (e.g., that comprise a metal chelator or that are free of a metal chelator).

The chelator itself may be modified to affect its overall charge balance (e.g., unloaded or loaded around neutral pH) such as through the addition of an acid or base group, coordination (e.g., so as to have at least 6, 7 or 8 coordination sites), and/or to incorporate solubility enhancing groups within or proximal to (e.g., with less than 10, 5 or 3 bonds) of the chelation groups.

The size of a mass tag polymer may be uniform. For example, the polymer may have low polydispersity, such as a polydispersity index of less than 1.5, 1.2, or 1.1. As such, the nanoparticles may be uniform in size (e.g., may have a polydispersity index of less than 1.5, 1.2, or 1.1).

Providing a polymer may include polymerizing pendant groups by living polymerization. In a living polymerization, chain termination and chain transfer reactions may be absent or minimal, and the rate of chain initiation may be quicker than the rate of chain propagation. The resulting polymer chain may grow at a more constant rate than seen in traditional chain polymerization, and the polymer length may remain consistent (i.e. they have a low polydispersity index as described herein). A living polymerization used to make a polymer of the subject application may include one or more of an anionic polymerization, controlled radical polymerizations (such as catalytic chain transfer polymerization, iniferter mediated polymerization, stable free radical mediated polymerization (SFRP), atom transfer radical polymerization (ATRP), reversible addition-fragmentation chain transfer (RAFT) polymerization, and iodine-transfer polymerization), cationic polymerization, and/or ring-opening polymerization. Polymerized pendant groups may include a chelator, solubility assisting group(s), or both. An individual pendant group of the polymer may include the chelator, solubility assisting groups, or both. Pendant groups of the polymer may be functionalized for addition of a chelator and/or solubility assisting group(s) after polymerization. Alternatively or in addition, at least some pendant groups may include chelator and/or solubility assisting groups prior to polymerization.

The polymer may include pendant groups that assist with (e.g., increase) solubility of the polymer, such as pegylated pendant groups. For example, the polymer may be modified to include pendant groups that assists with solubility of the polymer before and/or after loading with the metal isotope. Wherein the pendant groups include a hydrophilic group that assists with solubility of the polymer prior to and after loading of the metal isotope on the pendant groups. As such, one or more pendant groups of the polymer may include a chain of repeating hydrophilic groups (e.g., that assist with solubility of the polymer). For example, the coordinating pendant groups may include the hydrophilic groups and/or be separate from the pendant groups that include the hydrophilic groups. The chain of repeating hydrophilic groups may not affect coordination chemistry of coordinating pendant groups of the polymer. A hydrophilic group may include a PEG group. Assisted (e.g., increased) solubility of the polymer may assist with (e.g., increase) loading of the metal isotope in solution.

In certain aspects, pendant groups (e.g., having a chelator and/or solubility assisting groups) may be incorporated upon polymerization of the backbone. Alternatively or in addition, pendant groups, solubility assisting groups (e.g., chains), or both may be attached to functional groups provided by the polymer backbone, such as by any attachment chemistry known in the art. For example, a ratio of chelator to solubility assisting groups may be added to a polymer so as to obtain a ration of pendant groups with a chelator to pendant groups with solubility assisting groups (and no chelator). Suitable attachment chemistries may include carboxyl-to-amine reactive chemistry (e.g., such as reaction with carbodiimide), amine-reactive chemistry (e.g., such as reaction with NHS ester, imidoester, pentafluorophenyl ester, hydroxymethyl phosphine, etc.), sulfhydryl reactive chemistry (e.g., such as reaction with maleimide, haloacetyl (Bromo- or Iodo-), pyridyldisulfide, thiosulfonate, vinylsulfone, etc.), aldehyde reactive chemistry (e.g., such as reaction with hydrazide, alkoxyamine, etc.), hydroxyl reactive chemistry (e.g., such as reaction with isothiocyanate). Alternative method of attachment include click chemistry, such as strain promoted click chemistry (such as by DBCO-azide or TCO-tetrazine).

The polymer may include solubility assisting groups, at least some of which may be organized in chains. Solubility assisting groups, as used herein, may not coordinate a metal atom. A polymer may be pegylated to assist with (e.g., increase) solubility. For example, the polymer may include at least 50, at least 100, at least 200, or at least 500 PEG units (e.g., PEG groups). PEG units may be distributed across a plurality of pendant groups, such that multiple pendant groups of the polymer may be pegylated. For example, at least some pendant groups may include more than 5, more than 10, more than 20, more than 30, or more than 40 PEG units (e.g., organized in a chain). The number of PEG units on the polymer may assist with (e.g., increase) with loading of metal isotope onto the polymer. In certain aspects, less than 50% of all pendant groups on the polymer chelate zirconium and/or hafnium, and more than 50% of all pendant groups on the polymer include a plurality of PEG units. For example, less than 60% but more than 30%, such as less than 50% but more than 40% of pendant groups on the polymer may include a chelator.

In certain aspects, pegylation of a polymer may include attaching a chain of PEG units to a pendant group of a polymer. The chain may include 5 or more, 10 or more, 20 or more, 30 or more, 40 or more, or 50 or more PEG units. Pegylated pendant groups may include a chelator, or may be separate from pendant groups that include a chelator. The amount, distribution, and/or ratio of chelator and solubility assisting groups (e.g., PEG) may assist with loading of an isotopic composition on the polymer. For example, the amount, distribution and/or ratio of chelator and solubility assisting groups (e.g., PEG) may maximize (e.g., be within 80%, 90% or 95% of the maximum) of the amount of an isotopic composition (e.g., enriched isotope of the composition) that can be loaded onto the polymer. Loading of the polymer is discussed further herein.

The polymer (e.g., before loading, after loading, and/or after conjugation to a biologically active material) may not be aggregated (e.g., may not be prone to aggregation). For example, more than 90%, more than 95%, more than 98%, more than 99%, or substantially all of the polymer may not be aggregated. The polymer may be unloaded, may be loaded with an isotopic composition, and/or may be conjugated to a biologically active material as described herein. The polymer may be in solution as described herein. For example, more than 90%, more than 95%, more than 98%, more than 99%, or substantially all of the polymer may not be aggregated. A polymer provided (e.g., with additional components described herein) in a kit may be stable for at least 1 month, at least 3 months, at least 6 months, or at least a year.

A polymer of the subject application may include any suitable number of pendant groups (e.g., attached to repeat units on the polymer backbone), such as more than 2, 5, 10, 20, 30, 40, 50, 100 pendant groups. For example, a polymer may include at or between 2 and 100, between 5 and 80, between 10 and 50, or between 20 and 40 pendant groups.

Methods and kits may include a metal loading buffer for loading the isotopic composition onto the polymer. The metal loading buffer may be mixed with an isotopic composition in solution prior to loading on a polymer of the subject application. The metal loading buffer may be an acidic solution (e.g., including a strong acid such as one or more of nitric acid, sulfuric acid, hydrobromic acid, hydroiodic acid, perchloric acid, hydrochloric acid, and chloric acid). The isotopic composition may be provided in a form suitable to load on a polymer of the subject application. Alternatively or in addition, the loading buffer may include an acetate (e.g., alkali acetate), such as an ammonium acetate, sodium acetate, and/or an acetate paired with another alkali such as carbonate or bicarbonate. In certain aspects, metal may be loaded so as not to saturate all chelating groups of a polymer, e.g., to improve polymer solubility and/or decrease background or impact on SBP binding.

Chelators for Polymers

Chelators as used herein refer to a group of ligands that together coordinate (e.g., stably coordinate) a metal atom. The chelators may be present on pendant groups of the polymer and/or incorporated into the polymer backbone. In certain aspects, the chelators are included in pendant groups of the polymer.

In certain aspects, a polymer may include one or more pendant groups that include a ligand such as hydroxamate (used interchangeable herein with hydroxamic acid), azamacrocycle, phenoxyamine, salophen, cyclam, and/or derivative(s) thereof. The polymer may include a chelator known in the art, or a derivative thereof, that includes hydroxamate, azamacrocycle, phenoxyamine, salophen, or cyclam. In certain aspects, a chelator of the subject application may coordinate six or more, more than six, or eight sites on a zirconium or hafnium atom. For example, a chelator may form an octa-coordinate complex with at least one of zirconium or hafnium. For example, at least one of zirconium and hafnium may form an octa-coordinate complex with pendant groups of the polymer.

In certain aspects, a chelator of a polymer includes hydroxamate groups, such as in DFO and/or a derivative thereof. Alternatively or in addition, the polymer may include azamacrocycles, such as a 1,4,7,10-tetraazacyclododecane-1,4,7,10-tetraacetic acid (DOTA) chelator or a derivative thereof. In certain embodiments, a chelator may include one of DOTAM, DOTP and DOTA (e.g., loaded with or provided separately from a zirconium or hafnium isotope). In certain aspects, a chelator is a DOTA derivative with improved binding of zirconium or hafnium (and potentially reduced binding to a lanthanide) as compared to DOTA. For example, a DOTA derivative may coordinate eight sights on a zirconium and/or hafnium atom, and may optionally include spacing between ligands that assists with binding (e.g., stably binding) zirconium and/or hafnium. For example, the DOTA derivative may have increased binding to zirconium and/or hafnium as compared to a lanthanide isotope.

Nanoparticles and Nanoparticle Synthesis on Polymer

Metal nanoparticles, such as nanometer scale metal clusters, provide a high density of labeling atoms but have a number of drawbacks. Functionalization of a nanoparticle with an inert surface for attachment to an SBP is nontrivial, and would usually result in multiple attachment sites for SBPs. Synthesis of small nanoparticles (e.g., less than 10 nm or less than 5 nm) may be difficult, resulting in steric hindrance, poor solubility, poor colloidal stability (aggregation), and non-specific binding. Synthesis of metal cluster nanoparticles may be difficult (e.g., may require high temperatures and may be sensitive to synthesis conditions). Nanoparticles may not be uniform in size.

In certain aspects, a metal nanoparticle may be synthesized at moderate temperature (e.g., less than 100 degrees Celsius, less than 50 degrees Celsius, or less than 37 degrees Celsius) in the presence of an stabilizer, such as an organic stabilizer. For example, the metal nanoparticle may be a quantum dot. In certain aspects the organic stabilizer may comprise a thiol group, such as a cysteine.

In certain aspects, the stabilizer may act as a capping agent. The stabilizer may be on a polymer, and the nanoparticle may be synthesized on the polymer. The size of the polymer may limit (e.g., control) the size of the nanoparticle. The particle may include a linear or branched portion presenting multiple instances of the stabilizer. The particle may further include a attachment group for attaching the polymer (including a nanoparticle synthesized on the polymer) to a single SBP. The mass tag may have low polydispersity, such as a polydispersity index of less than 1.5, 1.2, or 1.1. As such, the nanoparticles may be uniform in size (e.g., may have a polydispersity index of less than 1.5, 1.2, or 1.1). The majority of nanoparticles may have a small diameter, such as a diameter between 1 and 10 nm, 1 and 5 nm, 1 and 3 nm, 1 and 2 nm, 2 and 5 nm, 2 and 3 nm. Nanoparticles may be of an element having a plurality of isotopes, such as Cadmium or Tellurium, but may have a non-natural composition of isotopes (such as an enriched isotope of Cadmium or Tellurium). Nanoparticles may be monodisperse. In certain aspects, a polymer may include a plurality of nanoparticles. In certain aspects, the rate of seeding nanoparticle growth on the polymer may be slower than the rate of growth. Rapid growth of the nanoparticle may consume the stabilizing groups on the polymer such that the polymer does not associate with nanoparticles growing on other polymers. Polymers may be dispersed to reduce the rate of multiple polymers associating with the same nanoparticle as it grows. In certain aspects, pre-formed (pre-seeded) nanoparticles may be mixed with polymers prior to growth of the nanoparticle on the polymer. In certain aspects, the polymer may have between 10 and 10000, between 10 and 1000, between 10 and 100, between 10 and 50, between 20 and 500, or between 20 and 100 instances of a stabilizer. In certain aspects, a polymer may have less than 10, or even just a single instance of a stabilizer, and stabilizer present in solution may enable nanoparticle growth on the polymer. The same or different stabilizer to the polymer may be provided in solution during synthesis of the nanoparticle on the polymer.

As described previously, small cadmium (CdSe, CdS, and CdTe) nanoparticles may be formed in the presence of thiol-alcohol or thiol-acid stabilizers. Synthesis of cysteine stabilized monodisperse CdsS nanoparticles may seeded with such nanoparticles. While synthesis and association of gold nanoparticles on large poly(cysteine) polymers has been reported without showing uniform size, monodispersity, or cysteine acting as a stabilizer or capping agent for gold nanoparticles. Of note, the synthesis of these nanoparticles were performed at moderate temperatures.

Aspects include Cd or CdTe nanoparticles comprising enriched isotopes and synthesized on a thiol-presenting polymer, such as a polycysteine polymer, and the use of such nanoparticles as mass tags for SBPs. In certain aspects SBP itself may provide the stabilizing agent, such as a thiol group (e.g., presented by a reduced antibody), and the nanoparticle may be synthesized directly on the SBP. Provided the thiol group is not proximal to the binding site of the SBP, direct synthesis may keep the nanoparticle from sterically interfering with binding.

Hybridization Schemes for Signal Amplification

Mass tagged oligonucleotides may be hybridized, directly or indirectly, to a target oligonucleotide. For example, one or more intermediate oligonucleotides may provide a scaffold on which a plurality of mass tagged oligonucleotides can hybridize, thereby amplifying signal. Aspect of the subject application therefore include oligonucleotides for hybridization based signal amplification.

The target oligonucleotide may be a DNA or RNA molecule (such as coding RNA, small interfering RNA, or micro RNA) endogenous to a cell. The target oligonucleotide may be single stranded. The target oligonucleotide may have a known specific sequence (or homology to a known specific sequence). In certain aspects, an SBP, such as an antibody or derivative thereof may be conjugated to the target oligonucleotide, such as to a synthetic single stranded DNA oligonucleotide comprising a known sequence. In such cases, both the antibody and the oligonucleotides may be referred to as SBPs.

After binding of the SBP to analyte in a sample, a plurality of mass-tagged oligonucleotides may be hybridized, directly or indirectly, to the first oligonucleotide. The hybridization may be branched or linear. In certain aspects, a polymerase may extend the first oligonucleotide along a template to provide additional hybridization sites. Mass tagged oligonucleotides may include a single labeling atom, or may include a polymer comprising multiple labeling atoms. Mass tagged oligonucleotides may include a labeling atom, such as a heavy metal atom, in the chemical structure of the oligonucleotide itself.

In certain aspects, a mass tagged oligonucleotide may be mass tagged with a high sensitivity polymer or a nanoparticle described herein.

Large Mass Tag Particles

Contrary to intuition, a large mass tag particle (e.g., larger than 50 nm, 100 nm, 200 nm, 500 nm or 1 um in diameter) may provide reduced background and/or disruption of SBP binding compared to a smaller particle (e.g., a nanoparticle) mass tag.

For example, non-specific (and non-covalent) binding of a mass tag to a sample or underlying substrate may be reduced in a larger mass tag particle in comparison to the force applied by washing mass tags to removed unbound tags. Specifically, non-specific binding may scale with the surface area of the particle, while the force disrupting non-specific binding under active washing of the mass tags may scale more with the weight of the mass tag (which scales exponentially compared to the surface area at increased particle diameter).

Further, SBPs may present multiple groups that bind to mass tags (such as reduced antibodies presenting a plurality of thiol groups), and particle mass tags may provide multiple SBP attachment groups. Smaller mass tag particles (e.g., less than 10 nm, less than 50 nm, or less than 100 nm) may become cross-linked with such SBPs. In comparison, a larger mass tag particle (e.g., larger than 200 nm, 500 nm, or 1 um) may bind to the majority of attachment groups on an SBP and/or prevent binding of other large mass tag particles to the same SBP molecule through steric hindrance.

Large mass tag particles may comprise a colloidal metal cluster (e.g., with a surface coated/capped and functionalized for binding to SBPs) such as a large nanoparticle, a branched or hyperbranched polymer or matrix comprising metal chelating groups, or a polymer (such as polystyrene) entrapping metal atoms.

Blocking Reagents

Blocking reagents (i.e., one or more blocking reagents) may be used to prevent non-specific binding of a mass-tagged SBP. Blocking reagents can be added to a cellular sample, such as cells in suspension or a cellular sample on a solid support, such as a tissue section on a slide. Mass-tagged SBPs may be added to the cellular sample after addition of, and/or in mixture with, the blocking reagents. In certain aspects, the concentration (e.g., molar concentration) of blocking reagents used may be in excess (such as at least 5, 10, 20, 50 or 100 times the amount) of the mass tagged SBPs. As described herein, mass tag polymers (and in particular high sensitivity polymers) may to have some background (e.g., such as signal on cells that do not express the target analyte, and/or artificial features such as edge effects and puncti).

Traditional blocking reagents include serum (e.g., BSA), gelatin, mike (or casein protein), often at more than 1%, or even more than 5% concentration in buffer. Alternatively or in addition to one or more traditional blocking reagents, one or more polymeric blocking reagents (e.g., that are not conjugated to an SBP) may be used. A polymeric blocking reagent may be a linear or branched polymer, and may include polar solubility enhancing groups and/or charged groups. Polymeric blocking reagents may be useful to prevent non-specific binding of SBPs tagged with high sensitivity polymers described herein. For example, a high sensitivity polymer (e.g., having on average more than 30 labeling atoms) may increase non-specific binding compared to a polymer with fewer labeling atoms, such as to the surface (e.g., glass surface) of a tissue slide.

In certain aspects, a polymeric blocking reagent may include a polymer backbone identical or similar to that of a mass-tag attached to an SBP and/or may have metal chelating groups (e.g., in addition to a traditional blocking reagent such as BSA) such as DOTA, DTPA, EDTA and/or or derivatives thereof. A polymeric blocking reagent may be a polymer mass tag unbound to an SBP, for example unbound to any biomolecule or bound to a non-specific biomolecule (such as a oligonucleotide randomer) or a protein that does not specifically tag a target analyte (such as BSA). The polymeric mass tag blocking reagent may be loaded with a metal isotope that is not used as a labelling atom for any SBP, for example an isotope outside the range of detection or already endogenous to the cell. Loading of the polymer mass tag with a metal isotope may make it chemically similar to the mass tags of SBPs, and allow it to bind non-specifically in a similar manner to the mass-tagged SBP. Blocking with a polymer mass tag may reduce non-specific binding of a mass-tagged SBP. In certain aspects, the distribution of a polymer mass tag blocking reagent (e.g., determined by measuring the mass channel of a metal loaded onto the mass tag polymer across pixels by IMC) may be used to reduce the reported amount of a mass-tagged SBP. For example, signal from mass-tagged SBPs may be normalized to a signal from a polymer mass tag blocking reagent.

In certain aspects, a polymeric blocking reagent may include a hydrophilic polymer such as a charged polymer, that does not include chelating groups. Hydrophilic polymers contain polar or charged functional groups, rendering them soluble in water. Within this section, most hydrophilic polymers are grouped by the chemistry of their structure. For example, acrylics include acrylic acid, acrylamide, and maleic anhydride polymers and copolymers. Amine-functional polymers include allylamine, ethyleneimine, oxazoline, and other polymers containing amine groups in their main- or side-chains.

In certain aspects, a charged polymer may have a plurality of negatively charged groups (and optionally a net negative charge), a plurality of positively charged groups (and optionally a net positive charge), or may be zwitterionic (having both positive and negatively charged groups such as strong acid/base groups at neutral pH, e.g., in close proximity such as within 20, 10, 5, 3 or 2 bonds of one another), and optionally a net neutral charge). A zwitterionic polymer may be a copolymer of both positively and negatively charged subunits, and may have one or more acrylic monomers. A zwitterionic polymer may be a polyampholyte or a polybetaine. A zwitterionic polymer may include zwitterionic groups such as ammoniophosphates (phosphobetaines or lecithin analogues), ammoniophosphonates (phosphonobetaines), ammoniophosphinates (phosphinobetaines), ammoniosulfonates (sulfobetaines such as suflobetaine methacrylate), ammoniosulfates, ammoniocarboxylates (carbo- or carboxybetaines), ammoniosulfonamides, ammoni-sulfon-imides, guanidiniocarboxylates (asparagine analogs), pyridiniocarboxylates, ammonio(alkoxy)dicyanoethenolates, ammonioboronates, sulfoniocarboxylates, phosphoniosulfonates, phosphoniocarboxylates, oxypyridine betaines.

Suitable hydrophilic polymers may include Poly(N-isopropylacrylamide) (PNIPAM) and Polyacrylamide (PAM), Poly(2-oxazoline) and Polyethylenimine (PEI), Poly(acrylic acid), Polymethacrylate and Other Acrylic Polymers, Poly (ethylene glycol) and Poly(ethylene oxide), Poly(vinyl alcohol) (PVA) and Copolymers, Poly(vinylpyrrolidone) (PVP) and Copolymers, Polyelectrolytes and/or derivatives thereof. Providers such as Sigma provide a broad catalogue of such hydrophilic polymers.

Such polymers may be synthesized by a plurality of polymerization techniques, including free radical polymerization (FRP), step-growth, and/or Ring-opening metathesis polymerization (ROMP). Polymerization may allow alternating incorporation of different monomers. A polymeric blocking reagent may be provided as a salt or in solution.

A charged polymer may have similar chemical characteristics to a polymer mass tag. For example, the chelating groups of a polymer mass tag may have a negative charge when unbound with a metal and/or may have a slight positive charge when loaded with a metal. A polymer mass tag loaded with a metal may not have each chelating group loaded with a metal (e.g., loading efficiency may be less than 100%, such as less than 90%, less than 80%, or less than 70%). As such, a polymer mass tag loaded with a metal may have charged groups, and may be zwitterionic. As such, a charged polymer blocking reagent may block surfaces on the sample (e.g., certain classes of biomolecules and/or the support of the sample itself) to which a particular polymer mass tag would otherwise bind non-specifically. Charged polymeric blocking reagents may be used at low concentration, such as less than 10%, 5%, 1%, 0.5%, or 0.1% by weight.

Blocking reagents used herein may reduce non-specific binding of mass-tagged SBPs by more than 50%, more than 75%, or more than 90%. Reduction in non-specific binding may be determined by staining of two serial tissue sections with the same mass-tagged SBPs, where only one section is blocked, and assessment of areas where the signal from the mass-tagged SBP is reduced. Alternatively or in addition, when non-specific binding has a characteristic pattern (such as an edge effect or spotting), reduction in non-specific binding can be assessed as the reduction in the pattern occurrence and/or intensity.

In certain aspects, a kit may include a mass tag (e.g., optionally attached to an SBP) and a polymeric blocking reagent described herein.

In certain aspects, metal nanoparticles (e.g., as discussed herein) may be used as a mass tag and may be blocked (e.g., passivated) with a polymeric blocking reagent discussed herein. The nanoparticle may be a silica coated lanthanide, or a non-lanthanide nanoparticle such as a non-lanthanide metal oxide nanoparticle. Challenges of metal nanoparticle mass tags (e.g., metal nanoparticles having a solid metal cluster) may include surface functionalization for attachment of SBPs, non-specific binding to a sample, non-specific adsorption of SBPs (such as antibodies or derivatives thereof), poor solubility and/or monodispersity. Coating of metal nanoparticle mass tags with a polymeric blocking reagent described herein may alleviate one or more of these characteristics. A polymeric blocking reagent may be added to a nanoparticle before surface functionalization, during surface functionalization (e.g., the polymeric blocking reagent may be cross linked with molecules comprising attachment groups, or may itself include groups for attachment of SBPs), after surface functionalization (e.g., to block any remaining surface of a metal cluster core that is exposed), before attachment of SBPs (e.g., to reduce non-specific adsorption of SBPs), and/or after attachment of SBPs (e.g., to reduce non-specific binding to a sample).

Combination with Secondary Affinity SBPs

For example, different secondary antibodies to primary antibodies from different species may allow signal amplification for a plurality of target analytes. Secondary antibodies may bind multiple sites on the Fc portion of a primary antibody. Alternatively, secondary SBPs may bind to fluorophores or other tags used on a primary SBP.

As discussed herein, signal amplification methods may work differently for different SBPs, even different types of a certain SBP such as an antibody. As such, secondary SBPs may be prepared for (or used in) signal amplification methods and validated (e.g., to determine low background and strong signal), then used (e.g., across different experiments) to detect a variety of different primary SBP analytes.

Biotin-avidin may be used as a secondary affinity. For example, a primary SBP bound to streptavidin would provide 4 sites for attachment of a biotinylated mass tag. Derivatives of biotin and avidin are within the scope of the subject application.

Combination with Enzymatic Deposition

In certain aspects, SBPs may be conjugated with an enzyme such as HRP. Mass tags described herein, such as mass tag polymers (e.g., high sensitivity polymers) may be conjugated to a water soluble substrate that is made insoluble by the enzyme and/or is modified by the enzyme to bind to the biological sample. In certain aspects, enzymatic cleavage may render the substrate insoluble, leading to deposition of the associated mass tag. Suitable enzymes include oxido-reductase enzymes (e.g. peroxidases), phosphatases (e.g. alkaline phosphatase), lactamases (e.g. β-lactamase), and galactosidases (e.g. β-D-galactosidase, β-galactosidase). HRP substrates include 3,3'-diaminobenzidine (DAB), 3,3',5,5'-tetramethylbenzidine (TMB), 2,2'-Azinobis [3-ethylbenzothiazoline-6-sulfonic acid] (ABTS), o-phenylenediamine dihydrochloride (OPD) and derivatives thereof. AP substrates include nitro blue tetrazolium chloride (NBT), and 5-bromo chloro-3-indolyl phosphate (BCIP), and/or p-Nitrophenyl Phosphate (PNPP) and derivatives thereof. Glucose oxidase substrates include Nitro blue tetrazolium chloride (NBT). β-galactosidase substrates include 5-bromo-4-chloro-3-indoyl-β-D-galactopyranoside (BCIG or X-Gal). For example, the enzyme may be horse radish peroxidase (HRP) or a derivative thereof, and the substrate may be tyramide moiety or a derivative thereof, such as a metal-chelating tyramide moiety. For example, the substrate may be a tyramide derivative comprising a tyramide moiety and a chelator (such as DTPA, DOTA or a derivative thereof) bound to a metal such as a lanthanide or isotope therof. An enzyme may be beta-galactosidase (beta1 Gal), alkaline phosphatase (AP), and/or horse radish peroxidase (HRP). In certain aspects, an enzyme may be deactivated and a new SBP with the same enzyme may then be used to deposit a different mass tag (e.g., having a different labeling atom).

The substrate may be provided separate from a metal to be loaded onto the substrate (e.g., a DTPA or DOTA chelator of the substrate). Alternatively, the substrate may be provided pre-loaded with a metal.

In certain aspects, the substrate, such as a metal-chelating (e.g., DTPA or DOTA modified) tyramide derivative, may form aggregates (e.g., that stick non-specifically to cells or a substrate that a tissue sample is mounted on, and/or that prevent deposition by the enzyme). Such aggregates may form if multiple instances of the tyramide derivative partially coordinate metals across multiple instances of the tyramide derivative. As such, the substrate may be filtered, such that aggregates are removed, prior to (e.g., less than a day before, less than 4 hours before, less than 2 hours before, less than 1 hour before, or less than 30 minutes before) applying the substrate to a sample tagged with the corresponding enzyme. The tyramide derivative may be less than 1 kDa, but the filter may be a 50 kDa or greater filter.

Alternatively or in addition, the metal (e.g., a lanthanide) or isotope thereof may be loaded onto the substrate (e.g., onto a chelator such as DTPA or DOTA of the substrate) prior to (e.g., less than a day before, less than 4 hours before, less than 2 hours before, less than 1 hour before, or less than 30 minutes before) applying the substrate to a sample tagged with the corresponding enzyme.

In certain aspects, a catalyst (i.e., enhancer) may be added alongside the substrate to increase the rate and/or extent of deposition. In certain aspects, a stop reagent may be added (e.g., in a wash buffer) to terminate the deposition of the substrate by the enzyme in a controlled fashion. The use of a catalyst and/or stop reagent may provide further control of the extent of the reaction to improve signal enhancement and/or provide better quantitation of the target. In certain aspects, the stop reagent or another reagent deactivates the enzyme, such that another instance of the enzyme may be associated with a different target, and a substrate comprising a different metal (e.g., lanthanide) or isotope thereof may be applied. As such, enzymatic deposition may be performed for multiple different targets by serially depositing substrates with different metals (e.g., lanthanides) or isotopes thereof.

For example, a catalyst for HRP deposition of tyramide derivative may increase the rate of radical formation (e.g., may be an electron mediator). For example, 6-hydroxybenzotriazole, an iodophenol such as p-iodophenol, a coumaric acid such as p-coumaric acid, are described by G. H. G. Thorpe and L. J. Kricka, Methods Enzymol. 1986; 133:331; aromatic amines in U.S. Pat. No. 4,279,950; acetanilides in Eur. Pat. Appl. No. 603953 (1994); the indophenols and phenothiazines N-substituted and indophenols in U.S. Pat. No. 5,171,668; boronic acids replaced in U.S. Pat. No. 5,629,168. Such mediators have been described for chemiluminescent, such as by U.S. Pat. No. 7,803,573. In certain aspects, the catalyst may be applied in a buffered solution comprising one or more of a borate (such as perborate or isoborate), acetate buffer and/or sulfonate.

In certain aspects, a stop reagent may be provided (e.g., for use within minutes of a catalyst enhanced reaction above), such as less than 5 minutes, or less than 3 minutes (e.g., at room temperature or a higher temperature) of a catalyzed HRP deposition. The stop reagent may comprise a peroxide, such as hydrogen peroxide in an amount sufficient to temporarily or permanently inactivate HRP. Alternatively or in addition, the stop reagent may include a component to quench radical formation, such as an azide. Alternatively or in addition, conditions such as microwave treatment, increase in temperature (e.g. above 50 degrees Celsius, such as above 60 degrees Celsius), or low pH (e.g., less than a pH of 4) may be applied to temporarily or permanently inactivate HRP. In certain aspects, the stop reagent may be applied in a wash buffer and/or may be incubated for one or more minutes. In certain aspects, another SBP conjugated to an HRP may be applied after the stop reaction, allowing for a multiplexed reaction in which different tyramide derivative mass tags are serially associated with different targets. After one or more rounds of enzyme based deposition of mass tags, a multiplexed and simultaneous staining step with a plurality of different mass-tagged SBPs may be performed. The sample may then be analyzed by imaging mass spectrometry, such as by LA-ICP-MS or by SIMS.

In certain aspects, multiplexing may be by hybridizing an oligonucleotide conjugated to an HRP, directly or indirectly, to an oligonucleotide conjugated to an SBP such as an antibody. This may allow for a quicker sequence of associating HRP with a target, depositing a new mass tagged tyramide, inactivating, then repeating with a new oligonucleotide-HRP conjugate. In such a system, a plurality of oligonucleotide-SBPs may be applied to the sample simultaneously earlier.

The association of HRP with a target through hybridization may be faster than an antibody stain, and may not be sensitive to damage to the sample after successive inactivation steps.

Kits for enzymatic deposition may therefore include a substrate, such as tyramide or a derivative thereof, and a metal, such as a lanthanide, or isotope thereof. The metal may be pre-loaded onto the substrate or may be provided separately for loading onto the substrate. In certain aspects, a kit may provide a mass tag tyramide derivative, and may further include a catalyst reagent, stop reagent, buffers, and/or filter as described above. The kit may further include additional components discussed in other embodiments herein.

Dual Tagging

Signal amplification for imaging mass cytometry may be combined with fluorescent tagging, allowing for identification of regions of interest by fluorescent microscopy and/or coregistration of fluorescence images with mass cytometry images. In certain aspects, an SBP may be mass tagged as described herein and also attached to a fluorophore tag. Such dual tagging may be through the same linker attached to the same attachment group on the SBP.

Single Molecule Detection

In certain aspects, signal amplification may allow for detection of a single SBP at a time. For example, an imaging mass cytometry instrument providing high sensitivity, high resolution, and a rapid rate of pixel acquisition may allow for detection of single SBPs mass tagged with signal amplification reagents and/or methods described herein. As such, a signal amplification mass tag may comprise a target barcode (unique combination) of isotopes, allowing a dramatic increase in target multiplexity. The combination of isotopes may include at least 2, at least 3, at least 4 or at least 5 different isotopes that do not naturally occur in mixture. For example, target barcoded mass tags that have a unique combination of 6 out of 20 different isotopes allows for 20 choose 6 (38,760) unique barcodes, any one of which could be used to tag a different SBP. In addition, target barcoded SBPs could be distinguished based on different ratios of isotopes. In certain aspects, a target barcoded mass tag may be a hybridization scheme of mass tagged oligonucleotides that together provide the unique combination of isotopes.

Kits

Kits for mass cytometry may include one or more reagents described herein. Any combination of the above described components may be provided in a kit. A kit may include a mass tag (e.g., polymer ass tag), isotopic composition, polymer loaded with an isotopic composition, polymer and isotopic composition provided separately, or polymer loaded with and isotopic composition and conjugated to an antibody.

Kits may further include any additional components (e.g., buffers, filters, etc.) for loading an isotopic composition on a polymer and/or binding a loaded polymer to a biologically active material. Alternatively or in addition, kits may include additional reagents for mass cytometry such as buffers, standards, cell barcodes, and/or reagents including heavy atoms of different masses (e.g., mass tags attached to biologically active materials, or provided for attachment to biologically active materials).

The kit may include additional isotopic compositions, separate and distinguishable (e.g., having an enriched isotope of a different mass) from the isotopic composition describe above. The additional isotopic compositions may include zirconium, hafnium and/or a lanthanide isotope. For example, the kit may further include an additional polymer including a plurality of pendant groups that chelate (e.g., stably chelate) a lanthanide but not zirconium or hafnium. In certain aspects, the kit may include a plurality of antibodies (e.g., to different targets) covalently bound to polymer loaded with distinct isotopic compositions. Such a collection of antibodies may be provided together in a single panel. A panel may be provided in solution, or in a lyophilized mixture including less than 10%, less than 5%, less than 4%, less than 3%, less than 2%, or less than 1% moisture by mass.

The invention claimed is:

1. A method of mass cytometry with signal amplification of at least one target analyte, the method comprising;
   contacting a cellular sample with a specific binding partner (SBP) that binds target analytes in the cellular sample;
   amplifying signal by associating more than 100 labeling atoms with a target analyte of the target analytes bound by the SBP;
   detecting the more than 100 labeling atoms by mass spectrometry,
   wherein the SBP is conjugated to a mass tag, the mass tag is a nanoparticle mass tag, and the nanoparticle mass tag is passivated with a polymer blocking reagent.

2. The method of claim 1, wherein background of the more than 100 labeling atoms is less than 10%.

3. The method of claim 1, wherein the mass tag is a polymer mass tag comprising metal chelating groups.

4. The method of claim 3, wherein the mass tag is a high sensitivity polymer, wherein the high sensitivity polymer comprises more than 30 labeling atoms.

5. The method of claim 1, wherein a plurality of mass tags is attached to SBPs through a branched heterofunctional linker.

6. The method of claim 5, wherein the mass tags are low molecular weight mass tag polymers bound to, or capable of binding to, less than 30 labeling atoms.

7. The method of claim 6, wherein the branched heterofunctional linkers are attached to SBPs or mass tags by click chemistry.

8. The method of claim 1, further comprising blocking the cellular sample with a polymeric blocking reagent, wherein the polymeric blocking reagent is not conjugated to the SBP.

9. The method of claim 8, wherein the polymeric blocking reagent comprises chelating groups loaded with a metal.

10. The method of claim 9, wherein the polymeric blocking reagent comprises positively and/or negatively charged groups.

11. The method of claim 1, wherein the SBP is a small moiety SBP.

12. The method of claim 1, wherein signal amplification comprises a hybridization scheme.

13. The method of claim 12, wherein signal amplification comprises hybridization of mass tagged oligonucleotides, directly or indirectly, to a single stranded oligonucleotide.

14. The method of claim 13, wherein the single stranded oligonucleotide is a single stranded DNA oligonucleotide conjugated to an antibody or derivative thereof bound to the target analyte.

15. The method of claim 1, further comprising signal amplification for more than 5 different target analytes, wherein the labeling atoms associated with different target analytes are distinguishable by mass spectrometry.

16. The method of claim 15, wherein at least one of the target analytes is a protein.

17. The method of claim 15, wherein at least one of the target analytes is an oligonucleotide.

18. The method of claim 1, wherein a plurality of SBPs that bind the target analyte are conjugated to the same large mass tag particle.

19. A signal amplification kit for mass cytometry, comprising:
   a mass tag comprising more than 30 labeling atoms or capable of binding more than 30 labeling atoms,
   wherein the mass tag is attached to a specific binding partner (SBP) or functionalized for attachment to the SBP,
   wherein mass tag is a nanoparticle mass tag, and the nanoparticle mass tag is passivated with a polymer blocking reagent.

20. The kit of claim 19, further comprising a branched heterofunctional linker.

21. The kit of claim 20, wherein the branched heterofunctional linker comprises multiple instances of a click chemistry group for attachment to the mass tag.

* * * * *